Figure 1:
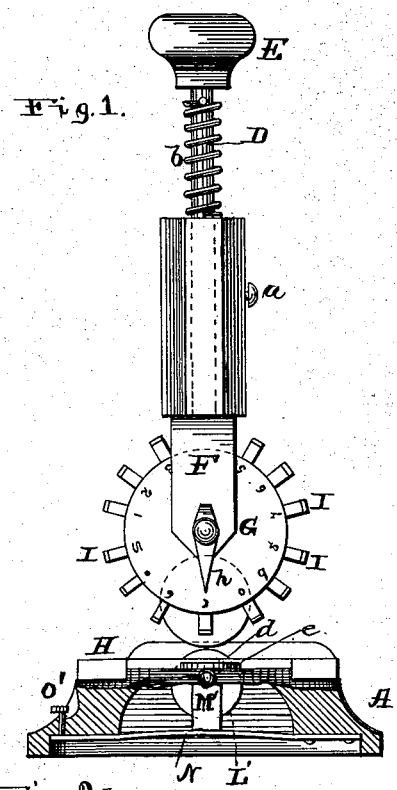
Figure 3:
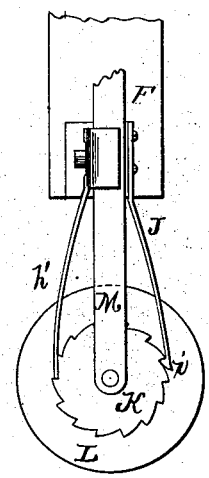
Figure 2:
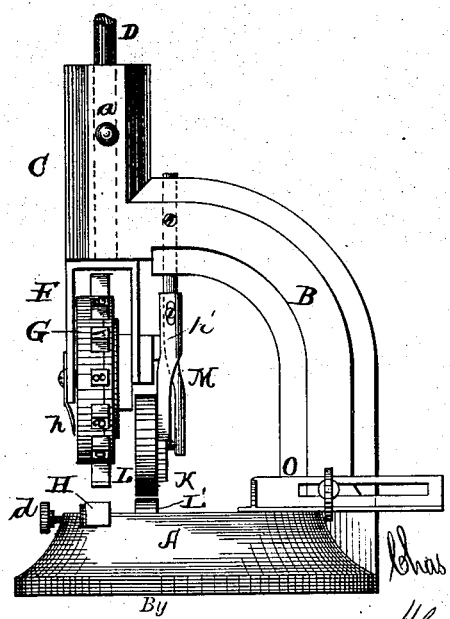

C. B. JAMES.
Bank-Check Marker.

No. 215,624. Patented May 20, 1879.

WITNESSES
H. Aubrey Toulmin
John Smith

INVENTOR
Chas. B. James.
By
Alexander & Mason
ATTORNEYS

UNITED STATES PATENT OFFICE.

CHARLES B. JAMES, OF BRISTOL, TENNESSEE.

IMPROVEMENT IN BANK-CHECK MARKERS.

period, or other character is cut out to indicate that the whole sum has been marked on the check.

Having thus fully described my invention, what I claim as new, and desire to secure by Letters Patent, is—

The combination, with a stand, A B C, of the shaft D, pointer $h$, wheel G, with type I, rollers L L', piece H, with spring $e$ and screw $d$, and the gage O, all substantially as and for the purposes herein set forth.

In testimony that I claim the foregoing I have hereunto set my hand this 26th day of February, 1879.

CHAS. B. JAMES.

Witnesses:
W. T. JOHNSON,
C. L. EVERT.